United States Patent
James

(10) Patent No.: US 7,970,210 B2
(45) Date of Patent: Jun. 28, 2011

(54) METHOD OF AND APPARATUS FOR CAPTURING, RECORDING, DISPLAYING AND CORRECTING INFORMATION ENTERED ON A PRINTED FORM

(75) Inventor: Arthur K. James, San Francisco, CA (US)

(73) Assignee: IS2BE, San Jose, CA (US)

( * ) Notice: Subject to any disclaimer, the term of this patent is extended or adjusted under 35 U.S.C. 154(b) by 1289 days.

(21) Appl. No.: 11/582,204

(22) Filed: Oct. 16, 2006

(65) Prior Publication Data

US 2007/0086654 A1    Apr. 19, 2007

Related U.S. Application Data

(60) Provisional application No. 60/727,894, filed on Oct. 17, 2005.

(51) Int. Cl.
  *G06K 9/00* (2006.01)
(52) U.S. Cl. .......... 382/186; 382/187; 382/313
(58) Field of Classification Search ........... 382/119, 382/186, 187, 188, 313, 314, 315, 321
See application file for complete search history.

(56) References Cited

U.S. PATENT DOCUMENTS

| | | | |
|---|---|---|---|
| 5,297,202 A * | 3/1994 | Kapp et al. ................. 705/75 |
| 5,544,255 A * | 8/1996 | Smithies et al. ............ 382/119 |
| 5,933,526 A * | 8/1999 | Sklarew .................... 382/189 |
| 6,631,200 B1 * | 10/2003 | Savoray et al. ............ 382/119 |
| 6,707,466 B1 * | 3/2004 | Van Sickle et al. ........ 345/641 |
| 6,816,274 B1 * | 11/2004 | Silverbrook et al. ...... 358/1.15 |
| 6,938,220 B1 | 8/2005 | Shigematsu et al. ....... 715/863 |
| 7,082,562 B2 * | 7/2006 | Lapstun et al. ............ 714/758 |
| 7,111,230 B2 * | 9/2006 | Euchner et al. ........... 715/232 |
| 7,120,853 B2 * | 10/2006 | Lapstun et al. ............ 714/781 |
| 7,259,752 B1 * | 8/2007 | Simmons ................. 345/173 |
| 7,551,779 B2 * | 6/2009 | Garside et al. ............ 382/186 |
| 2002/0067854 A1 | 6/2002 | Reintjes et al. ........... 382/199 |
| 2003/0064805 A1 | 4/2003 | Wells ...................... 463/39 |
| 2003/0092385 A1 | 5/2003 | Ranjan .................... 455/41 |
| 2004/0223647 A1 | 11/2004 | Blount et al. ............. 382/189 |
| 2005/0058347 A1 | 3/2005 | Lapstun et al. ............ 382/187 |
| 2005/0060644 A1 * | 3/2005 | Patterson ................ 715/505 |
| 2005/0145703 A1 * | 7/2005 | Bryborn .................. 235/494 |
| 2005/0277403 A1 * | 12/2005 | Schmidt et al. ........... 455/410 |

* cited by examiner

*Primary Examiner* — Jon Chang
(74) *Attorney, Agent, or Firm* — Haverstock & Owens LLP

(57) ABSTRACT

An information system for capturing, processing, and transmitting recorded information via writing devices is described. The system comprises computing devices, an application stored on a stand-alone computer or on an application server, and client devices, which execute the application as well as collect and store data. The computing device for capturing the data is preferably a digital pen. A data collector includes specifically designed forms or a graphic user interface (GUI) that enables the collection of vital information. A data storage module stores vital information processed by the application. The computing device and the client device are usable online or offline a network. The client device is selected from the group consisting of a computer, printer, scanner, or other digital devices and is usable online or offline a network.

8 Claims, 12 Drawing Sheets

A. Pen Stroke Alignment

B. Center of Gravity

Buffer

2) Cut One Page Into Multiple Pages

3) Write on Cut page

4) Determine which coordinate penstrokes fall in, adjust strokes to 0,0 and display only the single cut form. Separate pen strokes to individual coordinates and display coordinates for one cut page at a time

US 7,970,210 B2

METHOD OF AND APPARATUS FOR CAPTURING, RECORDING, DISPLAYING AND CORRECTING INFORMATION ENTERED ON A PRINTED FORM

RELATED APPLICATIONS(S)

This patent application claims priority under 35 U.S.C. §119(e) of the co-owned U.S. Provisional Patent Application No. 60/727,894, filed Oct. 17, 2005, and entitled "METHOD OF AND APPARATUS FOR CAPTURING, RECORDING, DISPLAYING AND CORRECTING INFORMATION ENTERED ON A PRINTED FORM" which is also hereby incorporated by reference in its entirety.

FIELD OF THE INVENTION

The present invention relates to the field of input and output devices. More specifically, the present invention relates to utilizing a writing instrument to capture, process, and transmit recorded information.

BACKGROUND OF THE INVENTION

The advent of the digital or paperless office was intended to make life easier for those who entered into the digital age. While storing data digitally has significant advantages in many aspects, there are a number of drawbacks as well. For example, before the digital age, people such as police officers, fire fighters, laboratory workers and doctors filled out forms or took notes with a standard writing instrument such as a pen or pencil. Then their handwritten notes were filed and stored. However, in the digital age, these people still have to take handwritten notes because it is overly expensive or too cumbersome to carry around a handheld or laptop computer, and they also have to enter the information into a computer for easy retrieval and storage. This requires people to write/enter the same information twice which lowers productivity and decreases quality because workers tend to be less focused when they have to repeat a task. Furthermore, workers, knowing they have to type the information into a computer later, will write down less on the original sheet and then attempt to type information from their recollection, thus causing degradation of the quality of the information.

SUMMARY OF THE INVENTION

An information system for capturing, processing, and transmitting recorded information via writing devices is described. The system comprises computing devices, an application stored on a stand-alone computer or on an application server, and client devices, which execute the application as well as collect and store data. The computing device for capturing the data is preferably a digital pen. A data collector includes specifically designed forms or a graphic user interface (GUI) that enables the collection of vital information. A data storage module stores vital information processed by the application. The computing device and the client device are usable online or offline a network. The client device is selected from the group consisting of a computer, printer, scanner, or other digital devices and is usable online or offline a network.

In one aspect, a system for capturing, processing and transmitting recorded information, comprises a data collector for enabling collection of data, a computing device for capturing the data using the data collector, a client device coupled to the computing device for receiving the data from the computing device and an application accessible by the client device for manipulating the data received from the computing device. The system further comprises a set of pre-patterned paper wherein the computing device captures the data using the set of pre-patterned paper. The data collector is a set of forms printed on the pre-patterned paper. The computing device is a digital pen. The client device is selected from the group consisting of a laptop computer, a PDA, a cellular phone, a printer, a scanner and a personal computer. Manipulating the data is selected from the group consisting of crossing out the data, applying dynamic resources to the data, aligning the data and tamper proofing the data. The application is stored on a device selected from the group consisting of the client device and a server. The system further comprises a data storage within the client device to store the data. The computing device is wireless-enabled. The computing device and the client device are online a network. Alternatively, the computing device and the client device are offline a network.

In another aspect, a system for capturing, processing, and transmitting recorded information, comprises a set of pre-patterned paper, a digital pen for capturing handwritten data using one or more forms contained on the set of pre-patterned paper, a client device for receiving the handwritten data from the digital pen and an application accessible by the client device for manipulating the handwritten data received from the digital pen, wherein manipulating the handwritten data is selected from the group consisting of crossing out the data, applying dynamic resources to the data, aligning the data and tamper proofing the data. The client device is selected from the group consisting of a laptop computer, a PDA, a cellular phone, a printer, a scanner and a personal computer. The application is stored on a device selected from the group consisting of the client device and a server. The system further comprises a data storage to store the handwritten data. The digital pen is wireless-enabled.

In yet another aspect, a method of capturing, processing, and transmitting recorded information, comprises acquiring pen stroke data, transmitting the pen stroke data to a client device, tamper proofing the pen stroke data, separating the pen stroke data into one or more user areas, determining if a cross out applies to the pen stroke data, utilizing dynamic resources to recognize the pen stroke data, adjusting alignment of the pen stroke data, verifying the pen stroke data and saving the pen stroke data. The pen stroke data is acquired using pre-patterned paper. The client device is selected from the group consisting of a laptop computer, a PDA, a cellular phone, a printer, a scanner and a personal computer. Tamper proofing further comprises inputting the pen stroke data into a pen stroke object, sending the pen stroke object through a checksum, encrypting a result of the checksum and attaching the result to the pen stroke object and validating the pen stroke object by resending the pen stroke object through the checksum. Determining if a cross out applies further comprises determining if the cross out applies to a word or a subset of a word in the pen stroke data and transmitting a modified set of pen stroke data to be recognized. Utilizing dynamic resources to recognize the pen stroke data further comprises applying one or more resources to the pen stroke data to determine a digital equivalent of the pen stroke data. Adjusting alignment of the pen stroke data further comprises adjusting one or more offsets.

In another aspect, a method of recognizing cross out text comprises acquiring pen stroke data, analyzing the pen stroke data for a cross out, determining if the cross out applies to a word or a subset of a word in the pen stroke data and transmitting a modified set of pen stroke data to be recognized. The modified set of pen stroke data is without pen strokes crossed out wherein the cross out applies to the subset of a word. The modified set of pen stroke data includes resequenced characters. Two words are time sequenced based on the cross out and multiple pen stroke files are generated wherein the cross out applies to the word. The pen stroke data written after the cross out are written on top of where the cross out occurred. Initials are assigned to the cross outs.

In yet another aspect, a method of implementing multiple resources to recognize an input comprises receiving one or more handwritten pen strokes and applying one or more resources to the one or more handwritten pen strokes to determine a digital equivalent of the handwritten pen strokes. The method further comprises displaying a result from applying the one or more resources to the one or more handwritten pen strokes wherein the result is displayed in an ordered list. The method further comprises selecting a result. The one or more resources applied relate to a field.

In another aspect, a method of registering data on a page to ensure the data is properly displayed on the page comprises aligning pen stroke data by adjusting one or more first offsets, aligning one or more user areas by adjusting one or more second offsets, adding a buffer offset to capture the pen stroke data that is within the buffer and aligning image data by adjusting one or more third offsets. The method further comprises examining a center of gravity of the pen stroke data to capture pen stroke data that has its center of gravity within the user area.

In another aspect, a method of tamper proofing a pen stroke comprises inputting recorded pen strokes into a pen stroke object, sending the pen stroke object through a checksum, encrypting a result of the checksum and attaching the result to the pen stroke object and validating the pen stroke object by resending the pen stroke object through the checksum.

In another aspect, a method of printing a pattern and an image on a standard printer comprises separating the pattern from the image, sending the image to a first print head, sending the pattern to an additional print head and printing the image and the pattern generating a combined printed image. The additional print head is coupled to an ink cartridge wherein the ink cartridge contains ink that reflects light in the infrared spectrum.

In yet another aspect, a system for generating a unique pattern with an image comprises a pattern component for generating a pattern file, a managing component for enabling a user to select and modify an object and a merging component for merging the pattern file with the object to generate a combined file. The pattern file is encrypted within a file wrapper. The object is selected from the group consisting of a form template and a printed capture report. The system further comprises printing the combined file on a printer.

DETAILED DESCRIPTION OF THE PREFERRED EMBODIMENT

The present invention is an information system for capturing, processing, and transmitting recorded information via writing devices. The system includes a digital writing device, computing devices, an application stored on a stand-alone computer or stored on an accessible application server, and client devices, which execute the application as well as collect and store data. The digital writing device is preferably a digital pen. A data collector includes specifically designed forms that enable the collection of information. A data storage module stores the information processed by the application. The computing devices and the client devices are usable online or offline a network. In addition to data being collected using the digital pen, other features are implemented as well. Cross outs are detected and handled in a manner that varies depending on whether an entire word is crossed out or part of the word is crossed out. By using resources and context, the present invention is able to properly determine what text was written by the user. By adjusting offsets, any alignment issues, whether they be related to text or images, are able to be corrected. Furthermore, to ensure the proper pen strokes are captured, tamper proofing is implemented as well. With regards to printing, the present invention allows a printer to print the digitally recognizable pattern while also printing an image on top of the pattern. Moreover, unique patterns are able to be designed and combined with a form or other image to be printed.

Figure 1:
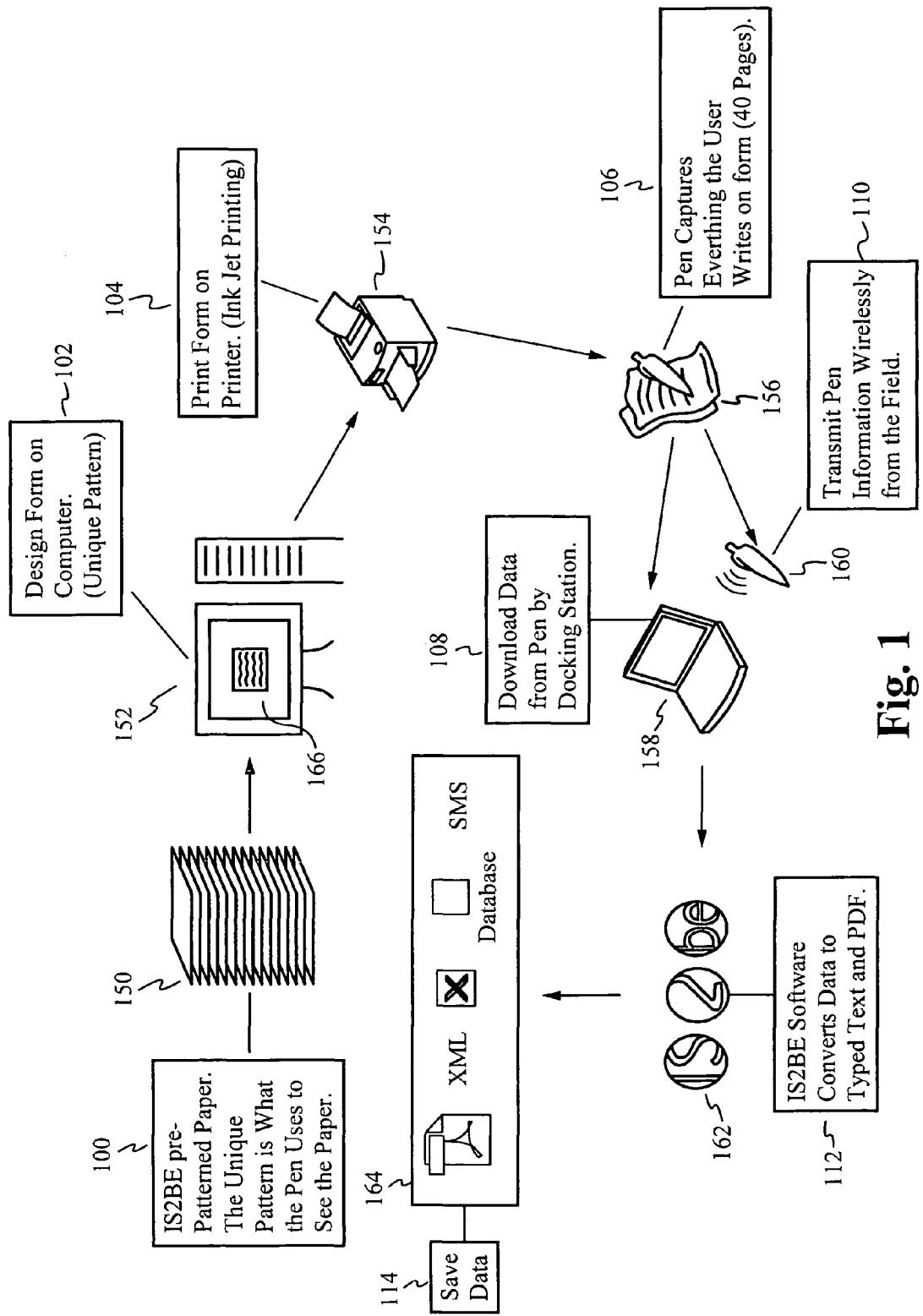
FIG. 1 illustrates a graphical representation of the flow and a method of utilizing the overall system of the present invention.

FIG. 1 illustrates a graphical representation of the overall system and a method of utilizing the overall system of the present invention. In the step 100, specific pre-patterned paper 150 is utilized so that a digital pen 156 or other device is able to recognize the paper 150. In the step 102, a form 166 is designed or obtained on a computing device 152. The form 166 is able to be a previously composed form or a newly generated form. In the step 104, the form 166 is printed on the pre-patterned paper 150 using a printer 154. Preferably, the printer 154 is an ink jet printer, a laser printer or a digital press machine. In some embodiments, users print the form 166 on the pre-patterned paper 150, and in other embodiments the form 166 is preprinted on the paper 150. In the step 106, a user utilizes the digital pen 156 or other device to write on the form 166. The form 166, when filled-in with the digital pen 156, enables the users to store the written information into a digital format. The digital pen 156 captures and records the written text or graphics in a digital format. In the step 108, after the pen is coupled to a docking station 158, the data captured is downloaded to the docking station 158. The docking station 158 is able to be any computing device including but not limited to a laptop computer, a cellular phone, a PDA, a printer, a scanner or a personal computer. Computing devices include standard computing components including, but not limited to, a hard drive or other storage device, a central processing unit, a display or monitor and other computing components. Additionally or instead of, digital pens equipped with wireless capabilities 160 are able to transmit the recorded information wirelessly, in the step 110. In the step 112, one or more applications 162 convert the hand written data to typed text, a PDF file, XML, an SQL database, Short Message Service (SMS) or any other format 164. In the step 114, the converted data is saved in its desired format 164.

Figure 2:
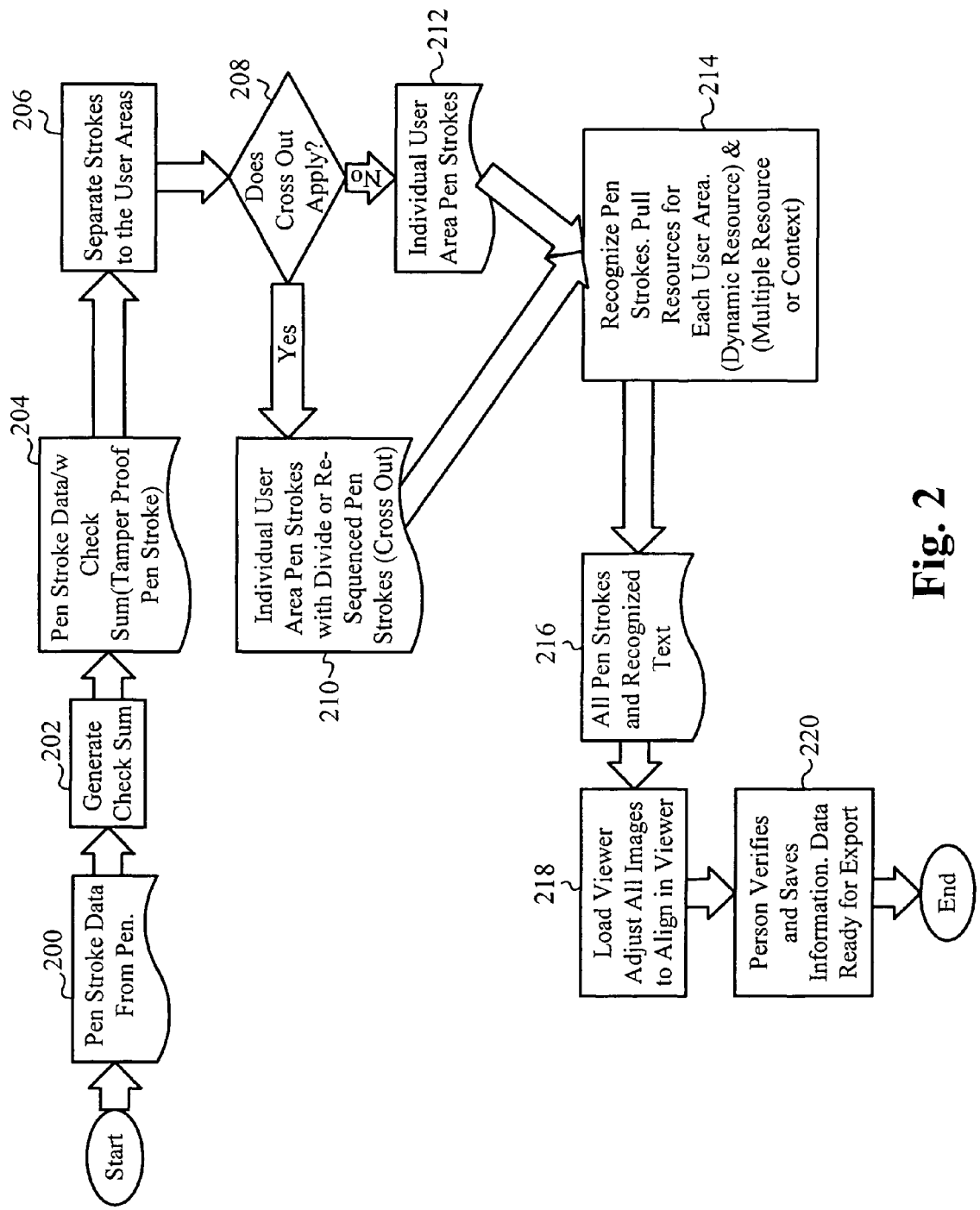
FIG. 2 illustrates techniques to allow the one or more applications to acquire data from a digital pen.

FIG. 2 illustrates techniques, as described in the subsequent sections, to allow the one or more applications to acquire and utilize data from a digital pen. In the step 200, pen stroke data from the pen is acquired. In the step 202, a check sum is generated. In the step 204, the pen stroke data with the check sum is used to ensure that the pen stroke data is tamper proof. In the step 206, the pen strokes are separated into user areas. In the step 208, it is determined if a cross out applies. If a cross out does apply, then in the step 210, the proper cross out process is executed as described below. If a cross out does not apply, then the pen strokes are sent to be recognized, in the step 212. In the step 214, the pen strokes are recognized and resources are pulled for each user area including dynamic resource and multiple resource/context. The pen strokes and recognized text are sent to a viewer, in the step 216. In the step 218, the viewer is loaded, and the images and text are adjusted and aligned. In the step 220, a user verifies and saves the information. In an alternative embodiment, the information is saved automatically without verification by a user.

Figure 3:
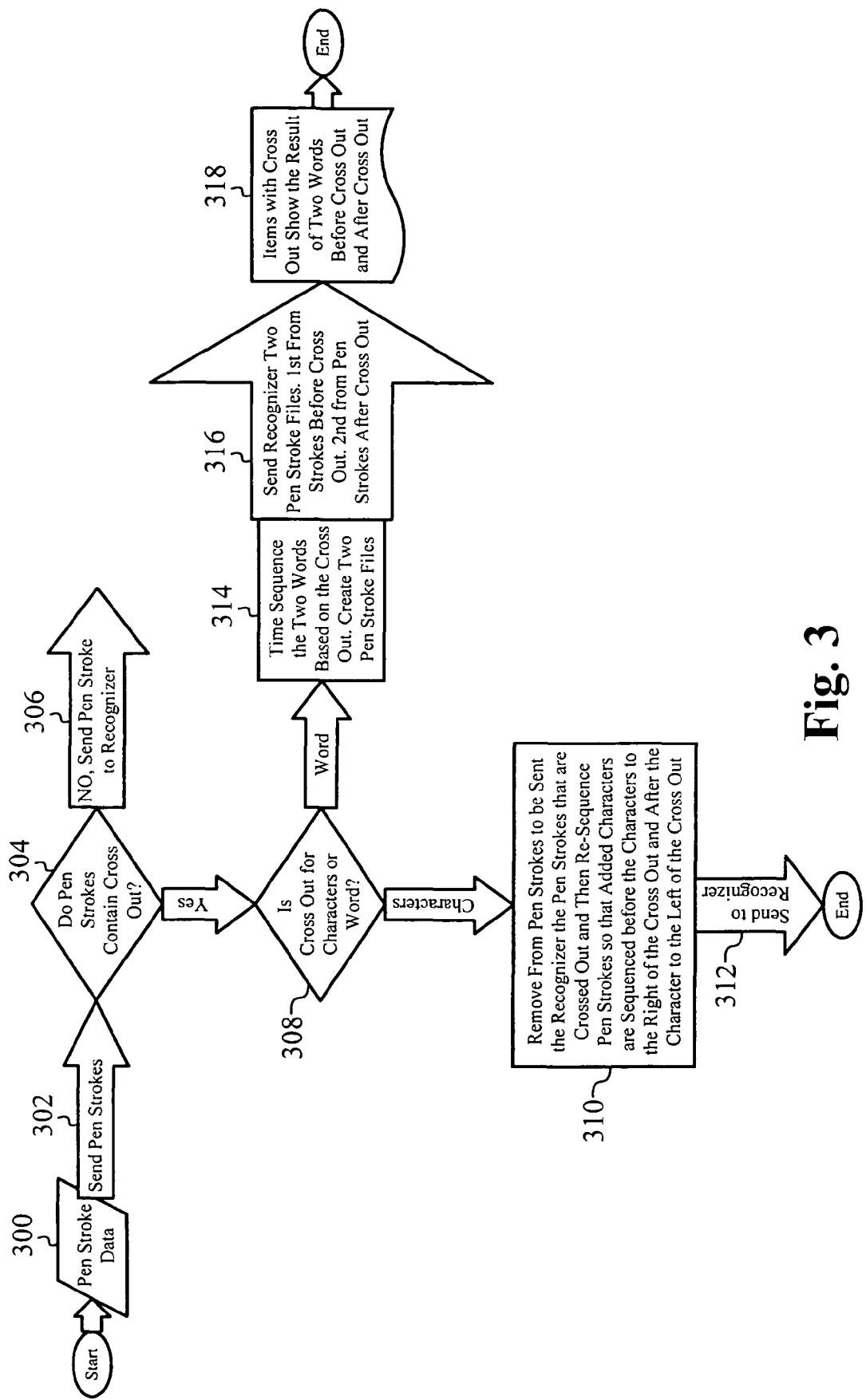
FIG. 3 illustrates a flowchart of a method of implementing recognition of a cross out of text.

FIG. 3 illustrates a method of implementing recognition a cross out of text. When a user crosses out letters or words using lines, each horizontal line is made through several existing pen strokes. According to the present invention, both the pen strokes for words or characters before and after the cross out are recognized. The strokes written after the cross out are written on top of where the cross out occurred. If the cross out is a complete word, then the two groups of pen strokes are kept separate. If only several letters are crossed out, then the sequence of the pen strokes is adjusted to appear in the correct order. The original time stamps of each entry are kept, but the sequence of the letters are adjusted for recognition purposes. When entire word cross out occurs and a new word is written, the user is presented with the original word and the new word. When cross out occurs for some of the letters of the word, then only the new word appears. Cross outs are also able to have initials assigned to them.

In the step 300, pen stroke data is acquired. The pen stroke data is sent to be checked for a cross out, in the step 302. In the step 304, the pen stroke data is checked for a cross out. If the pen stroke data does not contain a cross out, then the pen stroke data is sent to a recognizer to be recognized, in the step 306. If the pen stroke data does contain a cross out, the cross out is determined to be for characters (e.g. part of a word) or an entire word, in the step 308. If the cross out is for one or more characters and not the entire word, then in the step 310, the pen strokes that were to be sent to the recognizer are crossed out and removed. Additionally, the pen strokes are re-sequenced so that added characters are sequenced before the characters to the right of the cross out and after the characters to the left of the cross out. In other words, the sequence of the pen strokes are adjusted to appear in a left to right order. Then, in the step 312, the re-sequenced pen strokes are sent to the recognizer. If the cross out is for an entire word, then in the step 314, the two words, the crossed out word and the subsequently written word, are time sequenced based on the cross out. Two pen stroke files are generated. In the step 316, the two pen stroke files are sent to the recognizer, one from the strokes before the cross out and one from after. In the step 318, both words before and after the cross out are shown.

Figure 4:
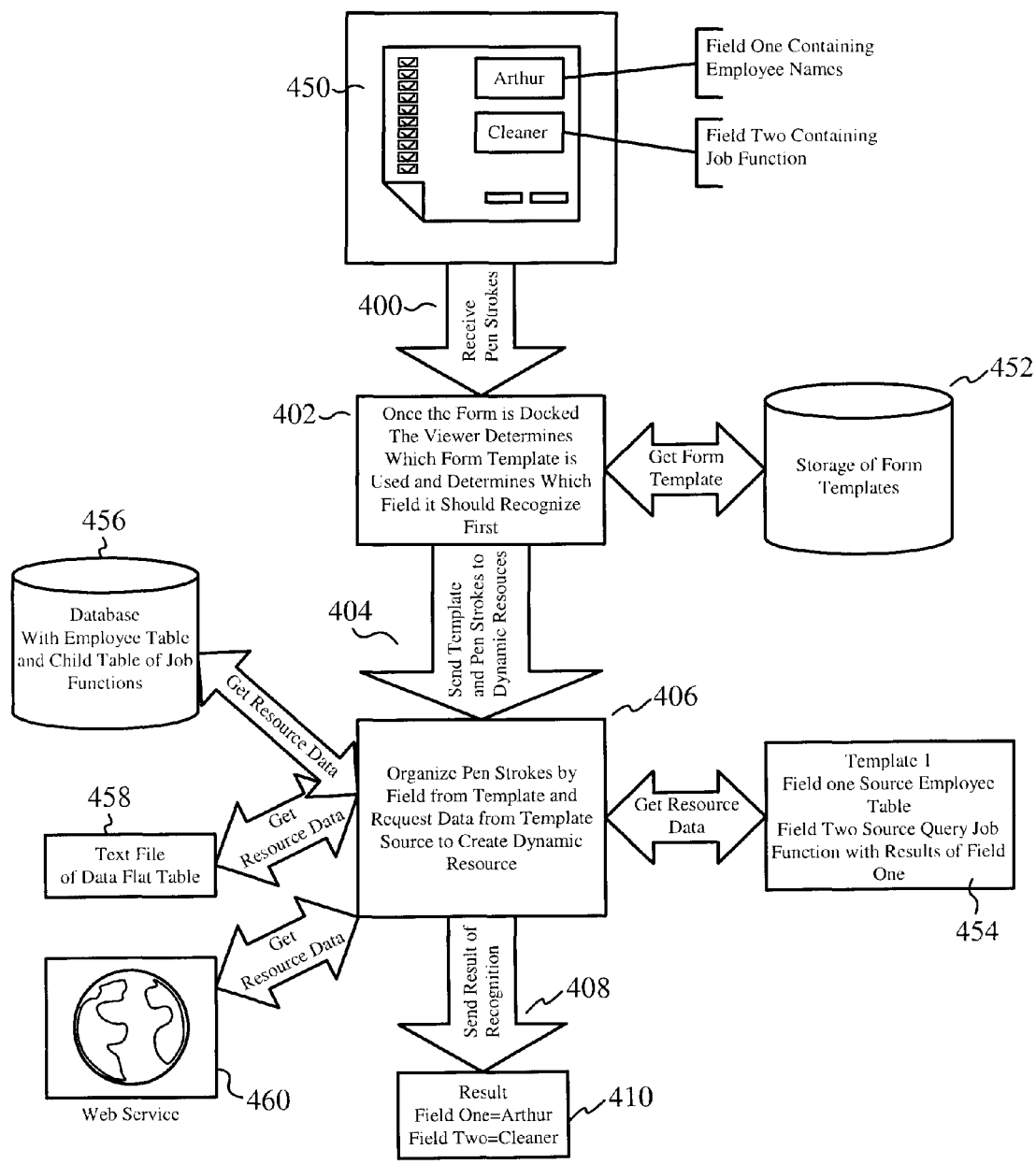
FIG. 4 illustrates a graphical representation of a method of recognizing context.

FIG. 4 illustrates a method of recognizing context. A recognition engine uses context or a resource list to help determine what word is written into a field. The list contains a universe of possible values that may be written into a field. Since the list is able to change quickly over time, a dynamic resource or context allows a user to add or remove values from the context and have them available for the recognition engine immediately. An application automatically pulls the latest list of values for a particular field each time. The values are able to be stored statically in a text file or generated dynamically based on a rule or selection criteria. For example, a form 450 contains an employee name field and a job function field. Pen strokes of entering information in the fields are received, in the step 400. In the step 402, a viewer determines which form template is being used and determines which field should be recognized first. The form templates are stored in a template form storage 452. In the step 404, the form template and the pen strokes are sent to a dynamic resource. In the step 406, the pen strokes are organized by field from the template and data is requested from a template source 454 to generate a dynamic resource. Resource data is acquired from the template source 454, databases 456, text files or flat tables 458 and/or Internet resources 460. The result of the recognition is output, in the step 408. In the step 410, the correct result 410 is displayed.

As a further example, using the name field and dynamic resources/context, a database or list of known names is utilized to recognize the appropriate pen strokes as described above. Thus, when a user pens the name, "Arthur," the dynamic resource is able to determine that since "Arthur" is a name, that is likely what the user entered in. Furthermore, if the penmanship were poor and the "t" looked like an "l" and the "u" looked like an "a," the dynamic resource would be able to determine that "Althar" is not a name and is able to determine that the user likely meant "Arthur." The examples above are not meant to limit the invention in any way. The dynamic resources are able to be utilized with more or less fields and other fields besides "name" and "job function" fields.

Figure 5:
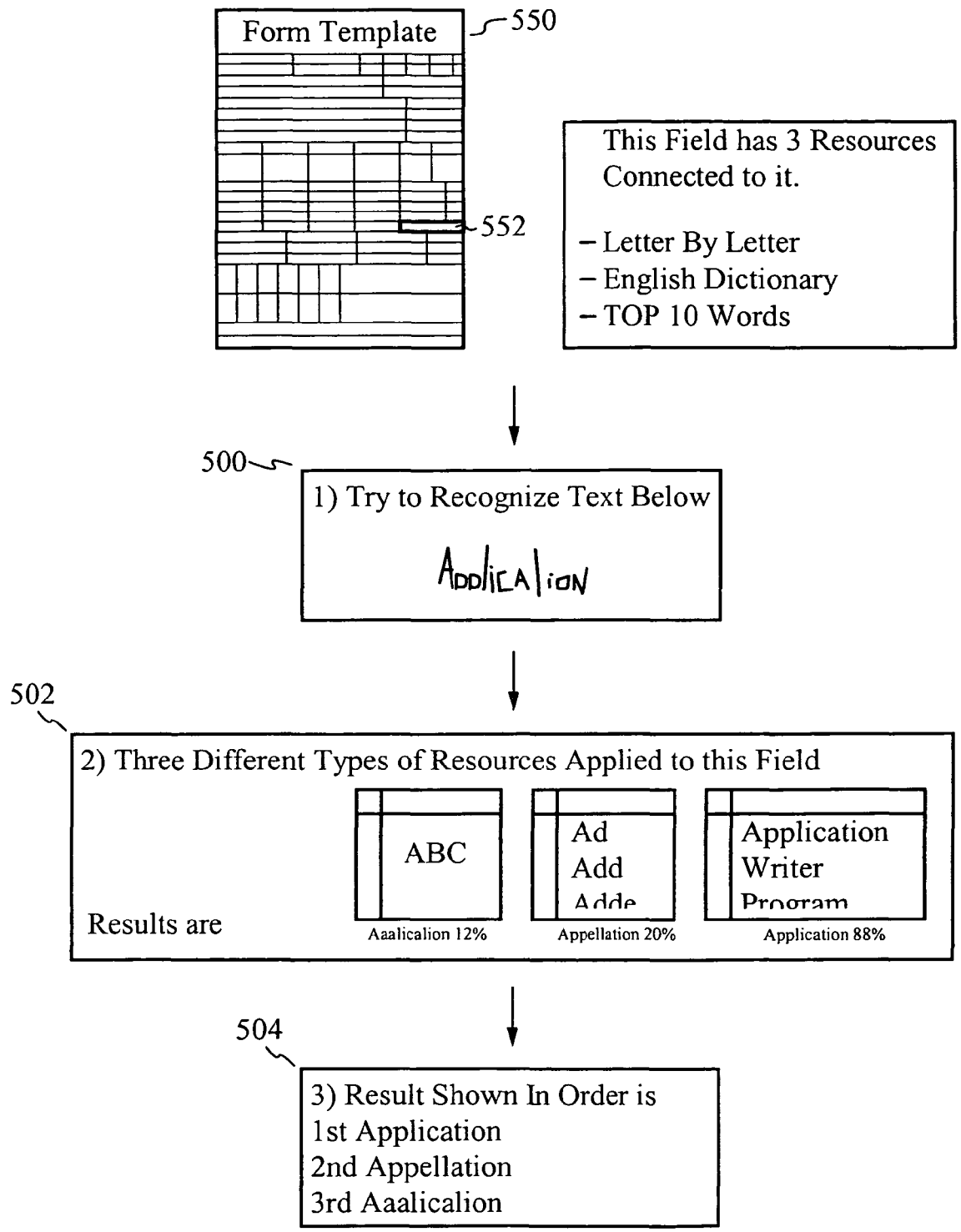
FIG. 5 illustrates a graphical representation of a method of utilizing the resources/context to list and confirm the proper word was recognized.

FIG. 5 illustrates utilizing the resources/context to list and confirm the proper word was recognized. Each field 502 of a form 550 has resources or contexts related to them. The recognition engine attempts to recognize the text entered, in the step 500. When the recognition engine runs, the application runs the pen strokes from the field 552 through the recognition engine with one of the attached resources, in the step 502. The application repeats this process by sending the same pen strokes through the recognition engine with the next attached resource. Each of the results are stored in a list ranked by either engine's percentage or ranked by order of the attached resources, in the step 504. The list is presented to the user at time of validation.

Using the example shown in FIG. 5, a user has written the text "Application" where the "pp" and the "t" are written particularly poorly. Specifically, the "pp" looks similar to "aa" and the "t" looks similar to an "l". However, using three different resources/contexts, the recognition engine develops three possible sequences of letters that could have been typed in. Using the "letter by letter" resource, the possible sequence of letters is a nonsensical word "Aaalicalion" which is estimated to be 12% correct. Using the "English Dictionary" resource, the possible word is "Appellation" which is estimated to be 20% correct. Finally, using the "top 10 words" resource, the possible word is "Application" with an estimate of being 88% right. Since "Application" is most likely the intended word, it is listed first in the results list, followed by "Appellation" and then "Aaalicalion." Thus, the user is able to correctly select the proper word he or she entered. In an alternative embodiment, the word with the highest probability of being correct is automatically selected without user intervention. Although the above example implemented three resources to determine the proper word, more or less and/or different resources are able to be implemented.

Figure 6:
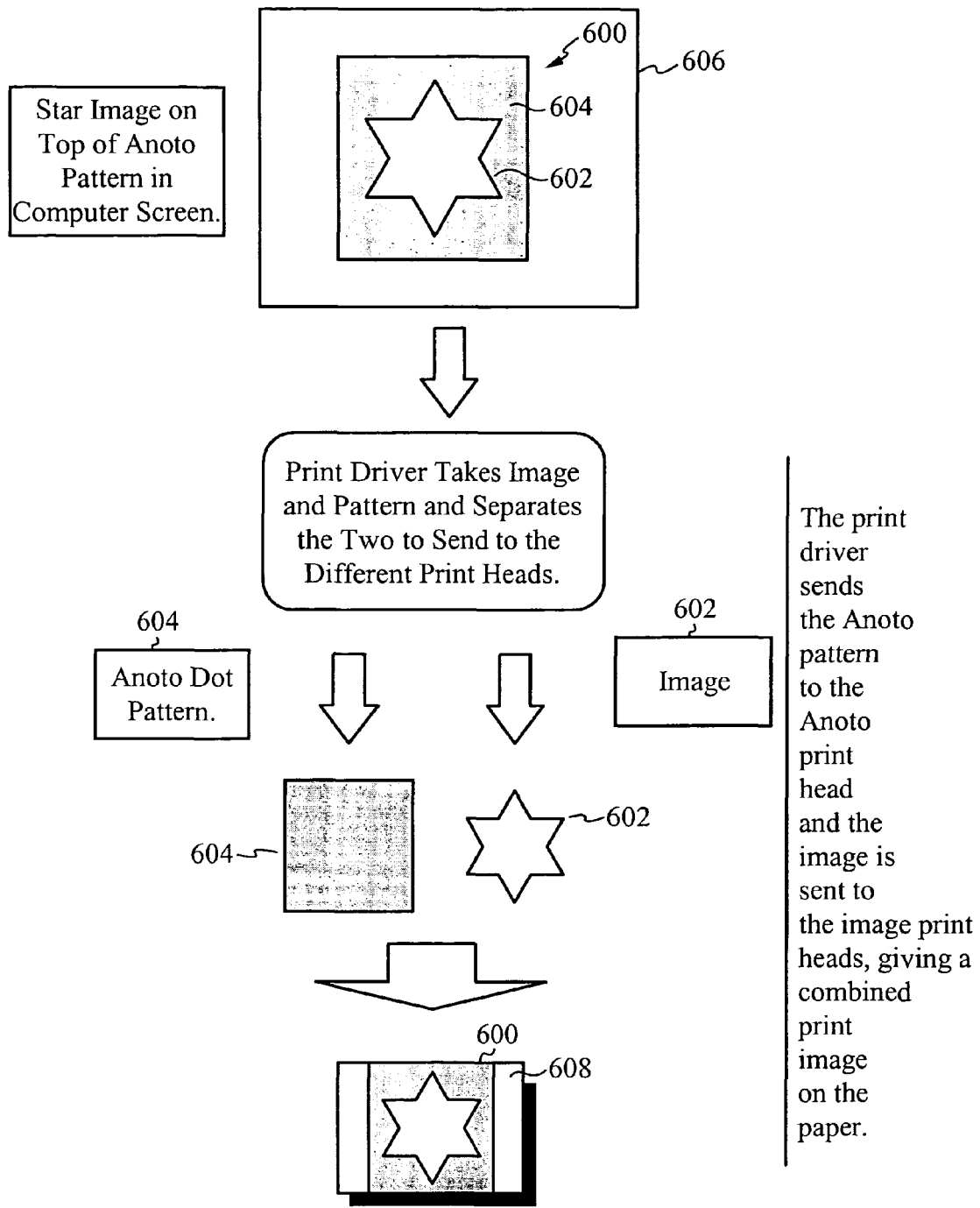
FIG. 6 illustrates a graphical representation of a method of printing a recognizable pattern and an image.

FIG. 6 illustrates a method of printing a recognizable pattern and an image. A printer, preferably an ink jet printer is able to be adapted to print a pattern, preferably an Anoto pattern. The Anoto pattern is the pattern utilized by the digital pen to determine what is being stroked. By adding an additional ink cartridge containing black ink that has characteristics of reflecting light in the infrared spectrum and a print head, an ink jet printer is able to be adapted to print the Anoto pattern with the added print head and cartridge. The printing is able to be done by several different routes. 1) A print driver separates out the Anoto pattern and the image. The driver sends the image to be printed by the non-Anoto print heads and the pattern is printed by the Anoto print head. 2) The Anoto pattern is assigned a special color called Anoto Black when the image is sent to the printer the driver separates the Anoto Black and sends it to the added print head with the special Black ink that reflects the infrared spectrum. The other parts of the image are sent to the other print heads based on the color desired.

A star image 602 on top of the Anoto pattern 604 is shown as a combined image/pattern 600 on a computer screen 606. A print driver takes the image 602 and pattern 604 and separates the two to send to different printer heads. The separated image 602 and pattern 604 are sent to their respective print heads, so that the image 602 and the pattern 604 are printed with the appropriate ink. Specifically, the pattern 604 is printed with the ink capable of reflecting light in the infrared spectrum. The end product is the combined image/pattern 600 on printer paper 608. The example above is not meant to limit the invention in any way. Specifically, the image is able to be any image, not just a star.

There are three types of registrations which are accomplished per page. Pen Stroke Registration, User Area Adjusted Registration, and Image Registration. Registration ensures that the entire page is presented to the user correctly such that text fits properly within the fields or user spaces and that images are aligned correctly as well.

First is pen stroke registration which includes: A) taking the pen strokes and applying an offset to make sure the strokes align with image of the form, B) examining the center of gravity of the pen stroke and pulling the pen stroke within a user area for recognition and C) scaling applied to the pen strokes depending on what operation is being accomplished. All of these values are saved as properties of the page.

Figure 7A:
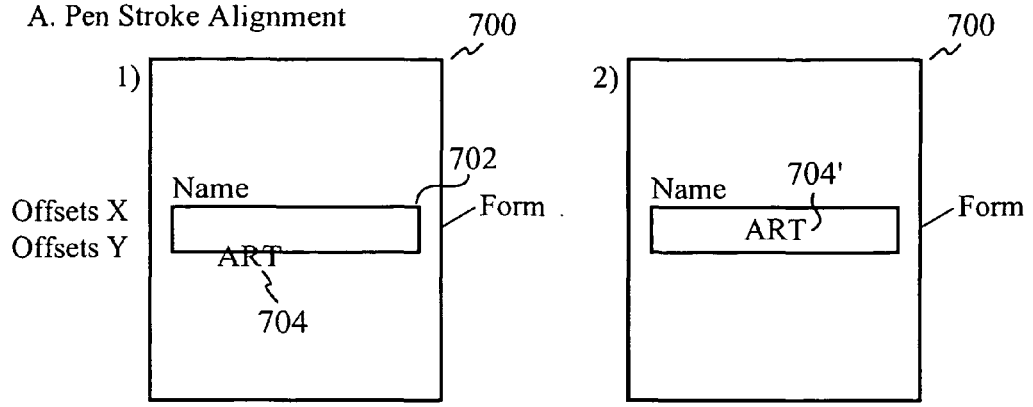
FIG. 7A illustrates a graphical representation of a method of pen stroke registration.

FIG. 7A illustrates registering pen strokes. A form 700 is shown with a field 702. The strokes 704, "Art," however are not contained within the field 702. Specifically, the X and Y offsets are incorrect. The X and Y offsets are then adjusted to align the strokes 704' to the form 700. Thus, the strokes 704' are properly placed within the appropriate location and aligned to the form 700.

Figure 7B:
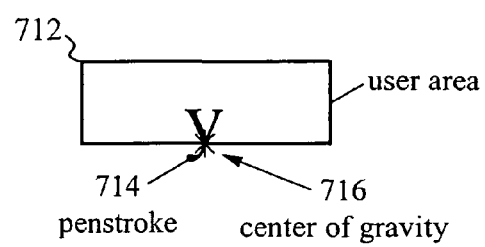
FIG. 7B illustrates a graphical representation of a method of examining the center of gravity of the pen strokes.

FIG. 7B illustrates examining the center of gravity of the pen strokes. A user area 712 is where a pen stroke 714 should be located if it is to be recognized. If the pen stroke's 714 center of gravity (as denoted by *) 716 is within the user area 712, then it will be recognized. For example, as shown, the pen stroke 714 of the letter "y" is partially within the user area 712 and partially outside of the user area 712. However, the center of gravity 716 is just within the user area 712, so the full pen stroke 714 is pulled into the user area 712 and is thus recognized.

Figure 8:
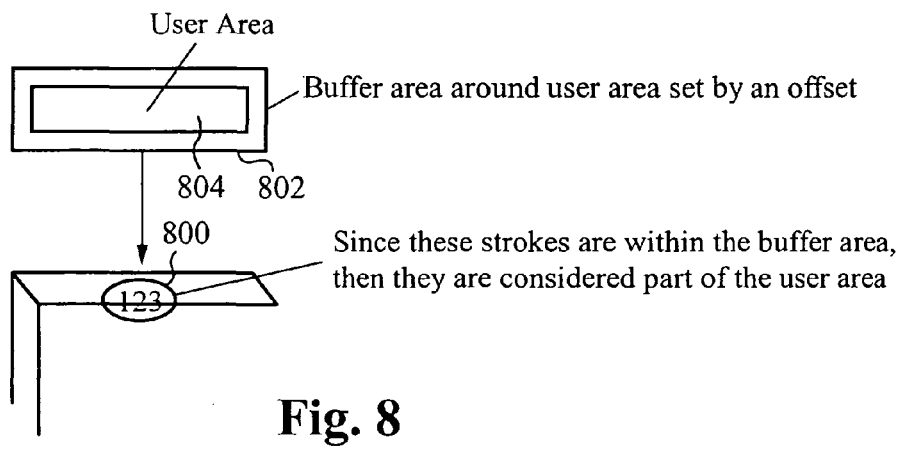
FIG. 8 illustrates a graphical representation of a method of implementing a buffer area.

The user's area adjusted registration includes: A) the user areas have an offset applied to them so they visually line up on the visual form and B) a buffer offset is added so that marginal pen strokes are considered a part of a user area. The buffer size is large enough so that text written close to, but slightly outside of the user area is retained, but not so large that extraneous marks are also captured. As shown in FIG. 8, if pen strokes 800 are within a buffer area 802, they are considered part of a user area 804.

Figure 9A:
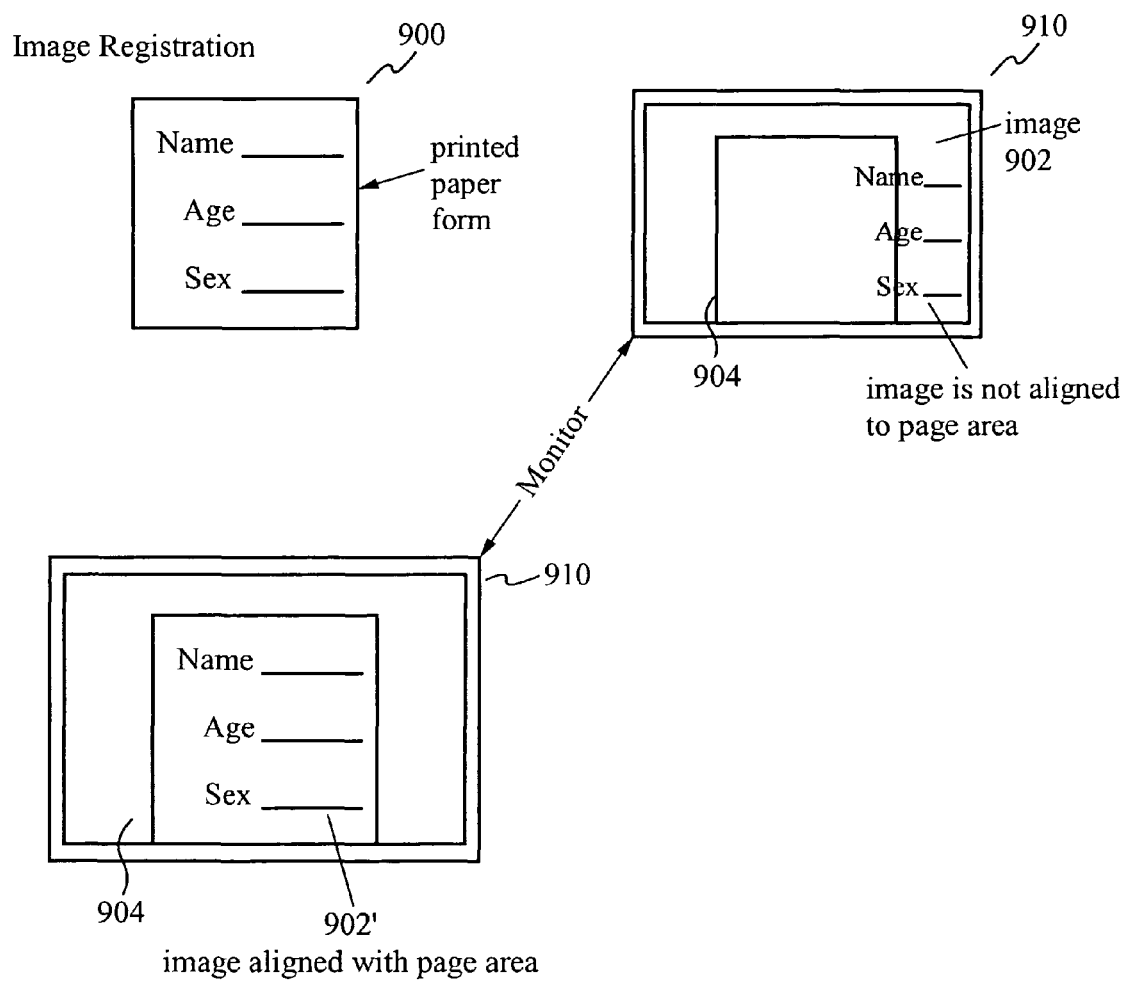
FIGS. 9A-B illustrate a graphical representation of methods of image registration.
Figure 9B:
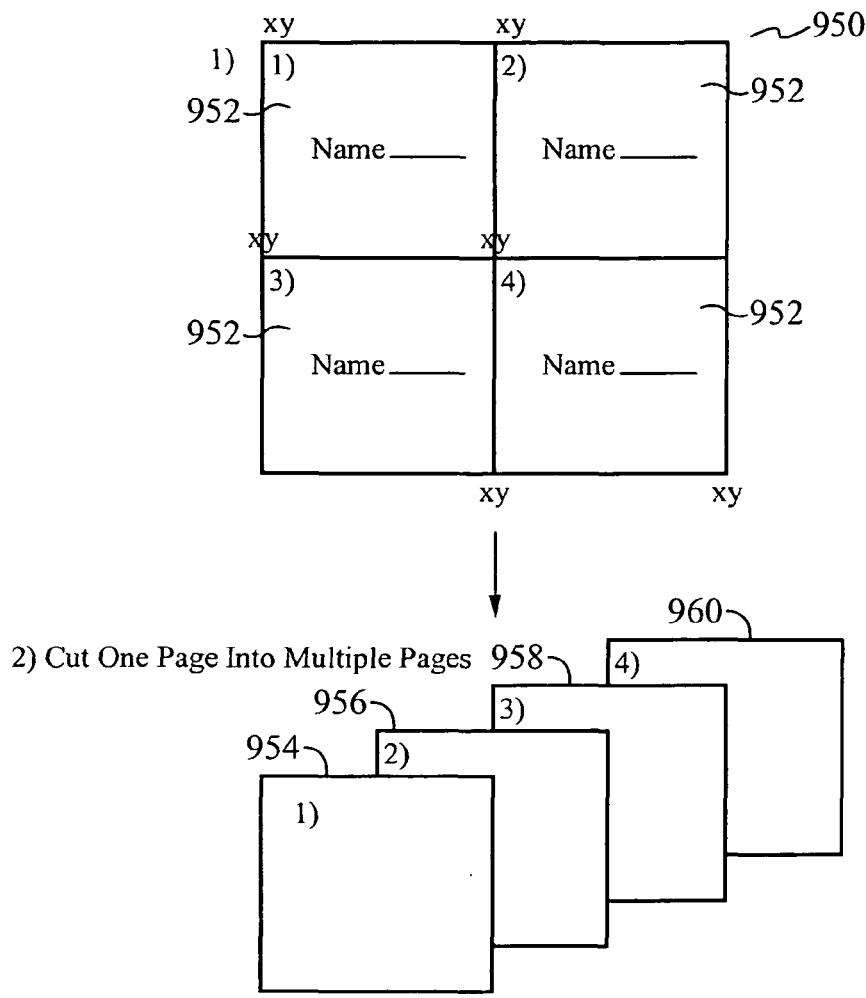
Figure 9B:
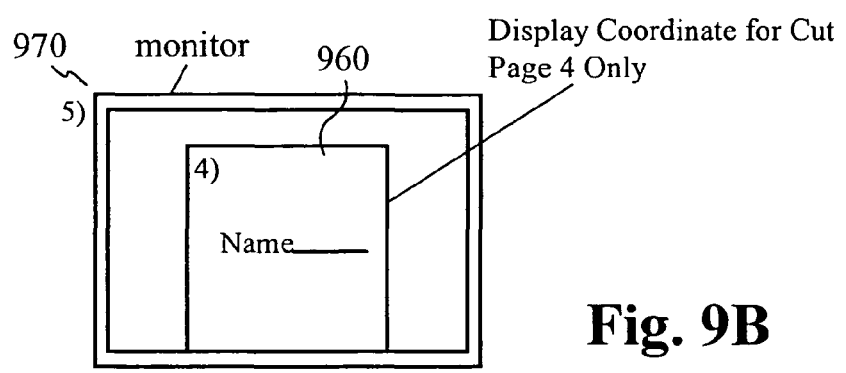

FIGS. 9A and 9B illustrate image registration. Image registration includes: A) applying an offset to the image to ensure the image is properly displayed in the viewer and B) since some forms are small, many of the same forms are able to be printed on one sheet. It is possible to reset the image, pen strokes and user areas to start from X=0 and Y=0 for each form area in the viewer. When this happens, the pen strokes are subdivided to each area and each make its separate file object and file.

In FIG. 9A, a single image is registered. A printed paper form 900 is shown. However, initially, an image 902 is not aligned on a page area 904 within a monitor 910. By applying the proper offsets, an aligned image 902' is properly located within the page area 904 on the monitor 910.

In FIG. 9B, multiple images are registered. Multiple forms 952 are contained within a single page 950 initially. To process the data correctly, the single page 950 is cut into multiple pages 954, 956, 958, 960. Pen stroke data is written to a page of the cut multiple pages 954, 956, 958, 960. Coordinates of where the pen strokes fall are determined, and the strokes are adjusted to be based on a new coordinate 0,0. Only a single cut form is displayed. For example, if data was written to form 4 on page 960, the page 960 is displayed on the monitor 970, and not the other pages. The pen strokes are separated to individual coordinates, and coordinates for one cut page are displayed at a time.

Figure 10:
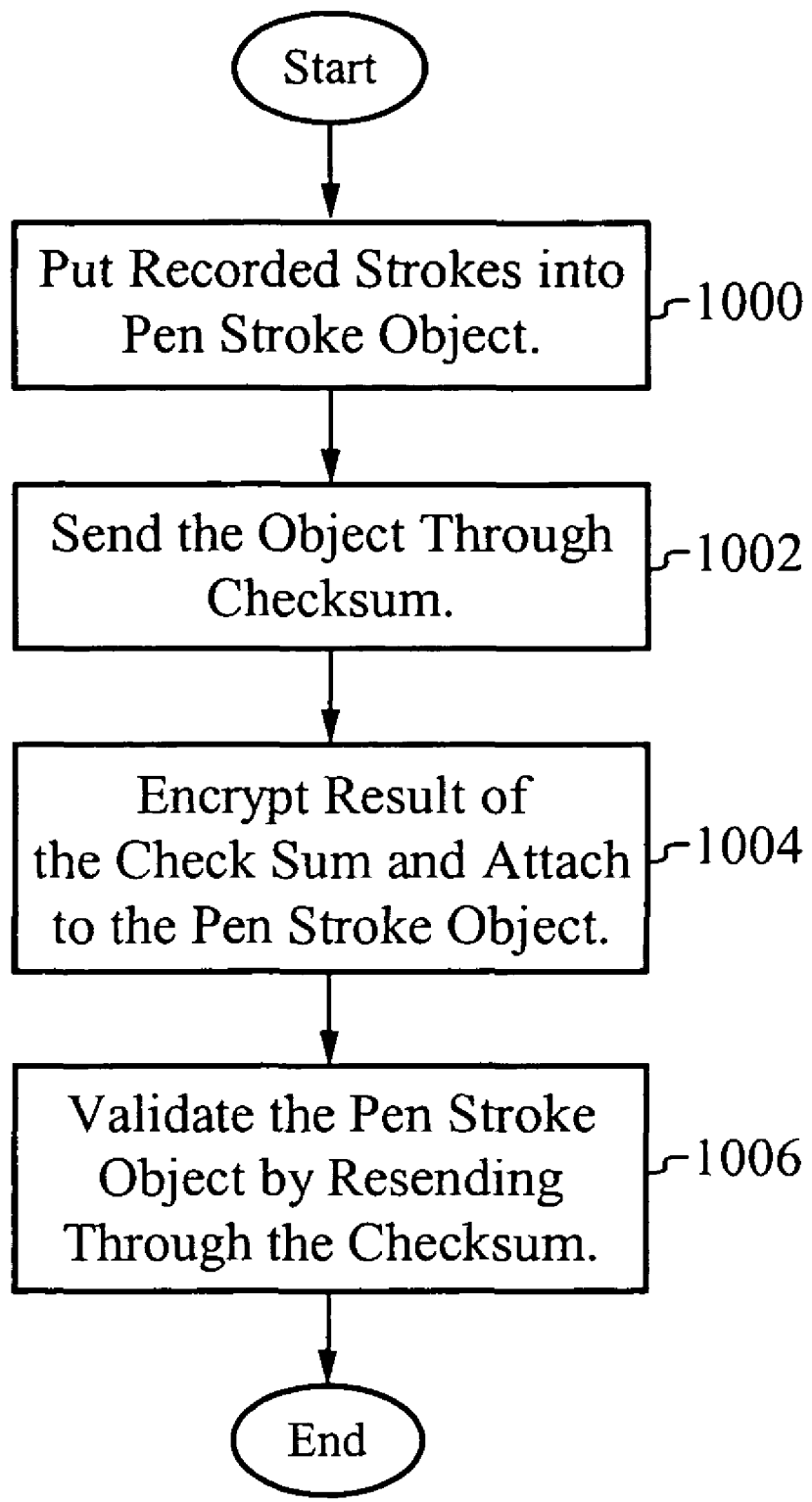
FIG. 10 illustrates a flowchart of a method of tamper proofing pen strokes.

FIG. 10 illustrates a method of tamper proofing pen strokes. When the pen is docked at the docking station, the recorded pen strokes are put into an empty pen stroke object, in the step 1000. Then the pen stroke object is run through a checksum routine, in the step 1002. The result is encrypted and attached to the pen stroke object, in the step 1004. Pen stroke objects are validated by resending the object through the checksum engine and comparing the objects value with the checksum encrypted results, in the step 1006.

Figure 11:
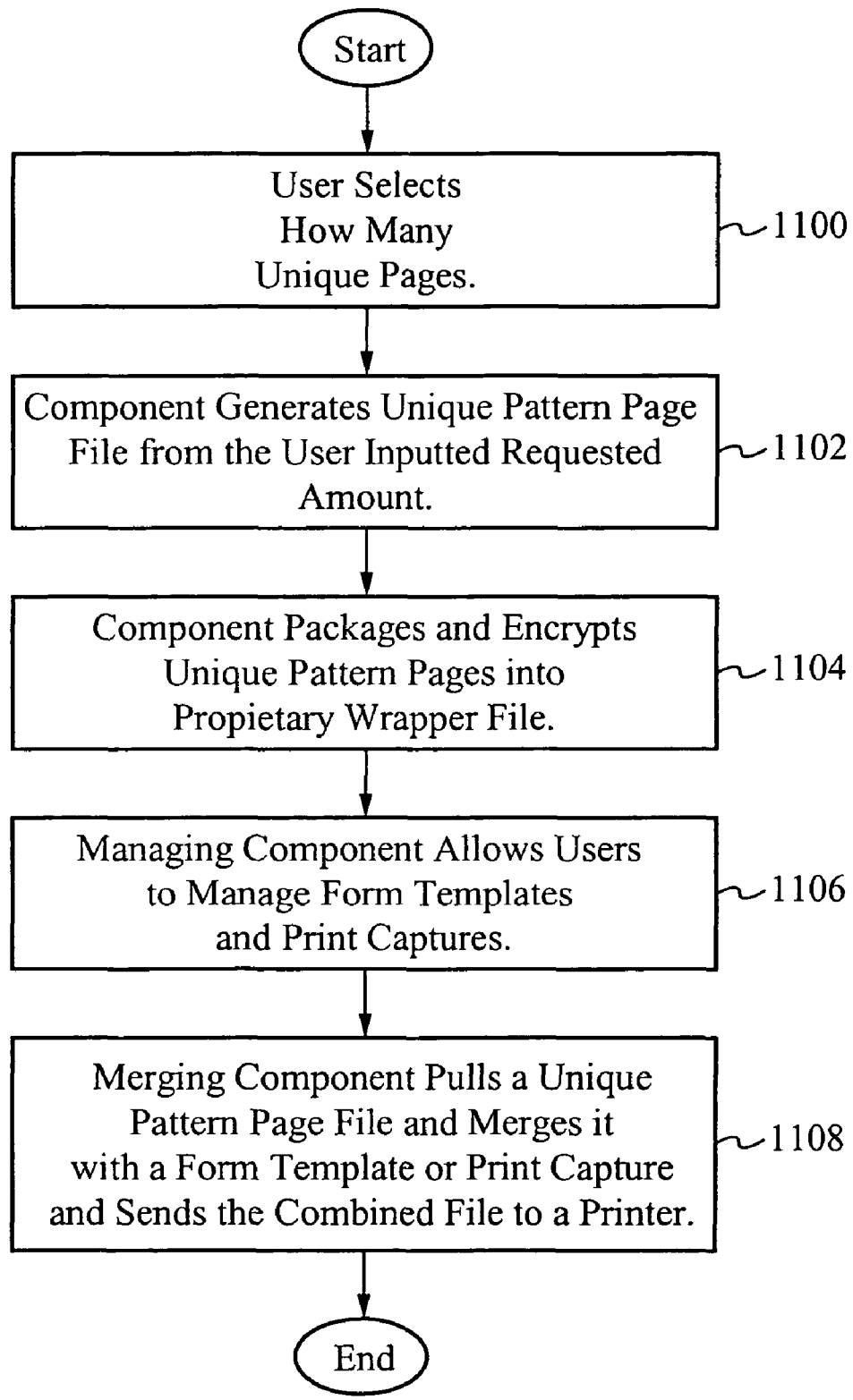
FIG. 11 illustrates a flowchart of a method of generating a unique pattern with an image and printing the pattern and image.

FIG. 11 illustrates a method of generating a unique pattern with an image and printing the pattern and image. An application includes three components which generates a proprietary file and sends the file directly to a color laser printer for output. In some embodiments, other types of printers are utilized.

A unique pattern page component generates pages of a size needed and quantity specified by a user, in the step 1100. The unique pattern page component then generates the pages as an electronic file, in the step 1102. The unique pattern page component assembles unique patterned page files and encrypts them into one large file and takes the individual postscript files, encrypts them, and stores them in proprietary wrapper file, in the step 1104.

A managing component is responsible for managing form templates and print captures. In the step 1106, the managing component enables the following functionality: 1) the user selects from form templates or from print captures, 2) the viewer shows either the form or print captures selected so that the user is able to pre-fill any data fields on the template form or if the form is a print capture, the user is able to add annotation and user fields from the viewer toolbar and 3) the color of the images is changed to pen friendly colors.

A merging component merges the unique pattern and the user selected form or the print capture file and sends the combined image to a printer, in the step 1108. Specifically, the merging component pulls one of the unique patterned pages from the proprietary wrapper file and overlays the images from the managing component and aligns the two images. The combined image and data are saved in a proprietary format. From the proprietary format, the combined image is printed using a printer, preferably a color laser printer.

Figure 12:
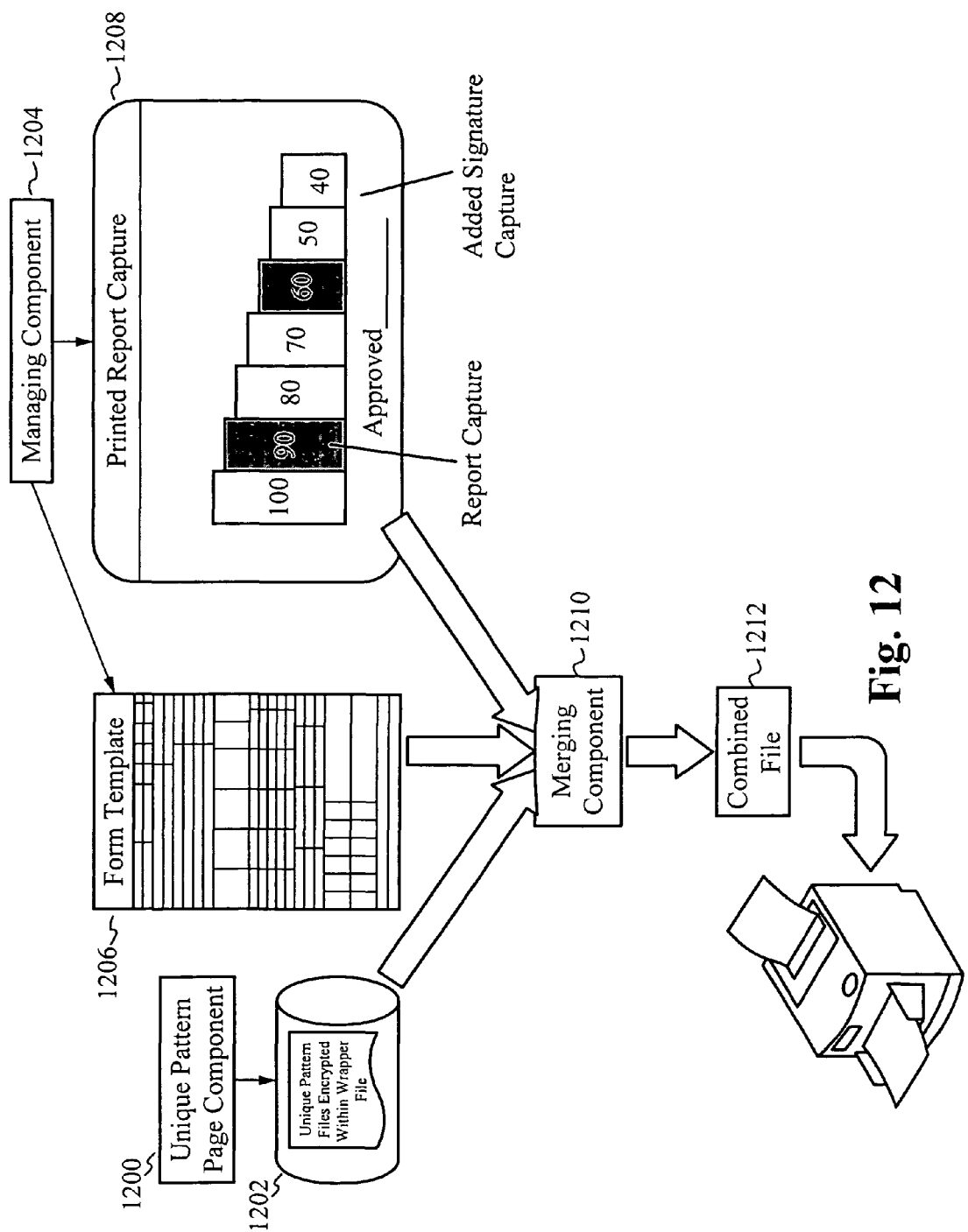
FIG. 12 illustrates a graphical representation of a system for generating a unique pattern with an image and printing the pattern and image.

FIG. 12 illustrates a system for generating a unique pattern with an image. As described above, a unique pattern page component 1200 generates a unique pattern file encrypted within a proprietary file wrapper 1202. A managing component 1204 allows a user to select and modify either a form template 1206 or a printed capture report 1208. A merging component 1210 merges the unique pattern file within a proprietary file wrapper 1202 with either the form template 1206 or the printed capture report 1208 into a combined file 1212. The combined file 1212 is then sent to a printer 1214.

There are many ways of utilizing the present invention. The digital pen and pre-patterned paper combination is able to be used to receive handwritten data and produce the data in a digital format without having to retype the information. In practice, such a device will enable police officers, doctors and others to more efficiently perform their duties by not having to handwrite information and then retype that same information for storage on a computer. Furthermore, with the features included in the present invention, users will more correctly have their handwritten data stored digitally. The printing aspects of the present invention allow a user to easily develop and print their own patterned pages for use with a digital pen or similar device.

In operation, the present invention is able to be used to transmit data to a computer while hand writing on the pre-patterned paper using a digital pen or other device. As the user handwrites text, the pen captures the text. When the captured text is sent to a docking station either by coupling the pen to the docking station physically or wirelessly, the text is manipulated in a number of ways which are generally transparent to the user. If there are any cross outs, they are handled as described above, depending on whether the entire word is crossed out or only a part of the word. Since people have different styles of handwriting and sometimes the handwriting is not easily recognizable, a recognition engine utilizes dynamic resources/context to ensure the proper word is captured. Furthermore, different types of resources/contexts are able to be applied so that the system has multiple options of correctly determining the written word as well as providing the user with these different possibilities. The user is then able to select the correct word. When text or images are not properly aligned, the present invention is able to correct the misalignment by changing the pen stroke offsets. Furthermore, the center of gravity is utilized to determine whether a pen stroke is adequately within a user area to be acquired. A buffer is also able to be used to include pen strokes if they are slightly outside of the user area. Image registration is utilized to ensure that images are properly aligned. A user's pen strokes are also able to be tamper proofed by using checksums to validate the user's pen strokes.

The present invention is also able to be utilized to print a digital pen-readable pattern with an image or text. As described herein, the printer needs the proper ink and an additional printer head to print the pattern using the specialized ink separately from the image or text which is printed using a standard printer head and ink. A unique pattern and form template or printed capture report are able to be managed and merged, so that they are able to be easily printed.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of capturing, processing, and transmitting recorded information, comprising:
   a. acquiring pen stroke data;
   b. transmitting the pen stroke data to a client device;
   c. tamper proofing the pen stroke data;
   d. separating the pen stroke data into one or more user areas;
   e. determining if a cross out applies to the pen stroke data;
   f. utilizing dynamic resources to recognize the pen stroke data;
   g. adjusting alignment of a portion of the pen stroke data independent of the remainder of the pen stroke data;
   h. verifying the pen stroke data; and
   i. saving the pen stroke data.

2. The method as claimed in claim 1 wherein the pen stroke data is acquired using pre-patterned paper.

3. The method as claimed in claim 1 wherein the client device is selected from the group consisting of a laptop computer, a PDA, a cellular phone, a printer, a scanner and a personal computer.

4. The method as claimed in claim 1 wherein determining if a cross out applies further comprises:
   a. determining if the cross out applies to a word or a subset of a word in the pen stroke data; and
   b. transmitting a modified set of pen stroke data to be recognized.

5. The method as claimed in claim 1 wherein utilizing dynamic resources to recognize the pen stroke data further comprises applying one or more resources to the pen stroke data to determine a digital equivalent of the pen stroke data.

6. The method as claimed in claim 1 wherein adjusting alignment of the pen stroke data further comprises adjusting one or more offsets.

7. A method of capturing, processing, and transmitting recorded information, comprising:
   a. acquiring pen stroke data;
   b. transmitting the pen stroke data to a client device;
   c. tamper proofing the pen stroke data;
   d. separating the pen stroke data into one or more user areas;
   e. determining if a cross out applies to the pen stroke data;
   f. utilizing dynamic resources to recognize the pen stroke data;
   g. adjusting alignment of the pen stroke data;
   h. verifying the pen stroke data;
   i. saving the pen stroke data;
   j. inputting the pen stroke data into a pen stroke object;
   k. sending the pen stroke object through a checksum;
   l. encrypting a result of the checksum and attaching the result to the pen stroke object; and
   m. validating the pen stroke object by resending the pen stroke object through the checksum.

8. A method of tamper proofing a pen stroke, comprising:
a. inputting recorded pen strokes into a pen stroke object;
b. sending the pen stroke object through a checksum;
c. encrypting a result of the checksum and attaching the result to the pen stroke object; and
d. validating the pen stroke object by resending the pen stroke object through the checksum.

* * * * *